United States Patent
Jarrier et al.

(10) Patent No.: US 8,382,869 B2
(45) Date of Patent: Feb. 26, 2013

(54) SYSTEM AND METHOD FOR REMOVAL OF PARTICULATE MATTER FROM A FILTER MEDIA

(75) Inventors: Etienne René Jarrier, Reading (GB); Simon Charles Larcombe, Southampton (GB)

(73) Assignee: General Electric Company, Schenectady, NY (US)

( * ) Notice: Subject to any disclaimer, the term of this patent is extended or adjusted under 35 U.S.C. 154(b) by 210 days.

(21) Appl. No.: 12/821,352

(22) Filed: Jun. 23, 2010

(65) Prior Publication Data

US 2011/0315015 A1  Dec. 29, 2011

(51) Int. Cl.
*B01D 46/04* (2006.01)

(52) U.S. Cl. ............. 55/302; 55/341.6; 55/379; 95/280

(58) Field of Classification Search ............ 55/361–382, 55/293, 294, 301–305, 341.1–341.7, 492, 55/494–511; 95/278–281; 96/425–428
See application file for complete search history.

(56) References Cited

U.S. PATENT DOCUMENTS

| | | | | |
|---|---|---|---|---|
| 4,058,379 A * | 11/1977 | Cheng | | 55/302 |
| 4,147,522 A * | 4/1979 | Gonas et al. | | 95/68 |
| 4,171,963 A * | 10/1979 | Schuler | | 55/302 |
| 4,209,310 A * | 6/1980 | Berkhoel | | 96/426 |
| 4,278,454 A * | 7/1981 | Nemesi | | 55/302 |
| 4,336,035 A * | 6/1982 | Evenstad et al. | | 95/286 |
| 4,357,151 A * | 11/1982 | Helfritch et al. | | 95/68 |
| 4,544,389 A * | 10/1985 | Howeth | | 55/302 |
| 4,578,092 A * | 3/1986 | Klimczak | | 55/302 |
| 4,735,638 A * | 4/1988 | Ciliberti et al. | | 55/302 |
| 4,738,696 A * | 4/1988 | Staffeld | | 55/341.1 |
| 4,820,320 A * | 4/1989 | Cox | | 55/302 |
| 4,867,771 A * | 9/1989 | Brennecke et al. | | 55/378 |
| 6,875,256 B2 * | 4/2005 | Gillingham et al. | | 95/273 |
| 8,114,196 B2 * | 2/2012 | Lamee | | 95/280 |
| 2002/0073849 A1* | 6/2002 | Buettner et al. | | 95/280 |
| 2008/0022855 A1* | 1/2008 | Clements | | 95/280 |
| 2009/0107337 A1* | 4/2009 | Vu | | 95/279 |
| 2010/0326024 A1* | 12/2010 | Vanderlinden et al. | | 55/357 |

* cited by examiner

*Primary Examiner* — Duane Smith
*Assistant Examiner* — Thomas McKenzie
(74) *Attorney, Agent, or Firm* — Ernest G. Cusick; Frank A. Landgraff

(57) ABSTRACT

A particulate filtration reverse pulse cleaning system is disclosed. The system comprising a housing, a tubesheet disposed within the housing, a filter for fluid communication with a tubesheet aperture, a support frame connectable with the tubesheet, and a cleaning system associated with the support frame. A filter cleaning system is also disclosed, the support frame comprising a plurality of hollow support legs comprising at least one cleaning aperture and a cleaning system associated with the plurality of hollow support legs. A method for cleaning a filter is also disclosed.

10 Claims, 7 Drawing Sheets

SYSTEM AND METHOD FOR REMOVAL OF PARTICULATE MATTER FROM A FILTER MEDIA

BACKGROUND OF THE INVENTION

The present invention generally relates to the removal of particulate matter from a filter media. More specifically, embodiments of the present invention relate to a reverse pulse integrated cleaning system for removing particulate matter from a fabric filter media.

Industrial gas turbine applications utilize intake air during normal operation for combustion purposes. The intake air is drawn through the compressor where it is subsequently mixed with fuel and ignited in a combustor, providing the driving force for a turbine. Because gas turbines are essentially air breathing engines, many factors and characteristics of intake air can affect performance and overall efficiency of a gas turbine system.

Factors that may affect the performance and efficiency of a gas turbine include the temperature of the intake air, site elevation, humidity, and the presence of contaminants in the intake air flow. The presence of contaminants in particular, has a significant detrimental impact on turbine efficiency. Contaminants such as dirt, dust, and salt can cause compressor blade corrosion, erosion, and fouling where the resulting surface roughness decreases compressor air flow and efficiency. This in turn, reduces the gas turbine output and overall thermal efficiency of the system.

In order to combat the effect of contaminants on gas turbine efficiency, filtration systems are typically used to remove particulate matter from an intake air stream. These systems may feature a filter media on the upstream side of a compressor in order to capture particulate matter before it reaches the combustor. Although effective, during long periods of operation, the filter media may become saturated with particulate matter, which subsequently impedes the flow of air and creates a significant pressure drop between the upstream and downstream side of the filter media. Therefore, periodic cleaning of the filter may be necessary.

Reverse pulse cleaning systems are known in the art for removing particulate matter from saturated filter media. These systems typically have a nozzle downstream of the filter connected to an air supply, where cleaning air is provided by the air supply and directed into the filter via the nozzle in a direction opposite of intake air flow. Because obtaining uniform cleaning down the length of the filter media provides enhanced gas turbine efficiency, an apparatus that accomplishes that goal may be desirable.

BRIEF DESCRIPTION OF THE INVENTION

One embodiment of the present invention is a particulate filtration reverse pulse cleaning system comprising a housing through which air flows in a first direction towards a housing outlet. A tubesheet is disposed within the housing, the tubesheet comprising a tubesheet aperture. There is also a filter for fluid communication with the tubesheet aperture, the filter comprising an open end adapted to be located adjacent to and surrounding the tubesheet aperture. There is a support frame connectable with the tubesheet, the support frame for supporting the filter, the filter through which air flows in the first direction, and the support frame comprising a plurality of support legs. Finally, there is a cleaning system associated with the support frame, the cleaning system comprising a cleaning jet source associated with the plurality of support legs for directing cleaning fluid in a second direction opposite the first direction.

In another embodiment of the present invention, there is a filter cleaning system comprising a support frame comprising a plurality of hollow support legs comprising at least one cleaning aperture. There is also a cleaning system associated with the plurality of hollow support legs, the cleaning system for directing cleaning fluid in a second direction through the at least one cleaning aperture.

A method for cleaning a filter is disclosed, the method comprising providing a support frame comprising a plurality of support legs, a filter, and a cleaning system associated with the support frame. The cleaning system also comprising a cleaning jet source for directing cleaning fluid in a second direction. The method also further comprising positioning the filter around the support frame and providing cleaning fluid to the cleaning system at a supply pressure sufficient to dislodge particulate matter from the filter.

BRIEF DESCRIPTION OF THE DRAWINGS

Further features of the invention will become apparent to those skilled in the art to which the invention relates from reading the following description with reference to the accompanying drawings, in which.

DETAILED DESCRIPTION OF THE INVENTION

Embodiments of the present invention are directed to the use of an integrated reverse pulse cleaning system for gas turbine inlet filters, featuring a support frame for facilitating improved cleaning efficiency, elongated filter life span, and prevention of filter oscillations and air bypass.

For the entirety of this document, "fluid" shall include, but is not limited to, air or any other suitable medium for facilitating cleaning of a filter media. "Substantially unimpeded flow" shall mean the ability of fluid to flow between destinations without experiencing a pressure drop.

Horizontally or vertically arranged filter cartridges that collect and prevent particulate matter from entering a gas turbine system are typically held in place by a multi-legged support frame. In these systems, the support frame is coupled to a tubesheet and a filter cartridge and arranged such that an open end of the filter is secured to the tubesheet. In these arrangements, particulate matter is removed from the filter media via an air pulse nozzle located downstream of a filter cartridge. However, as the distance between the air pulse nozzle and areas of the filter increase, cleaning efficiency may suffer. Therefore, one aspect of the invention provides a support frame including an integrated cleaning system to overcome the consequences of previously known downstream reverse pulse cleaning systems.

Figure 1:
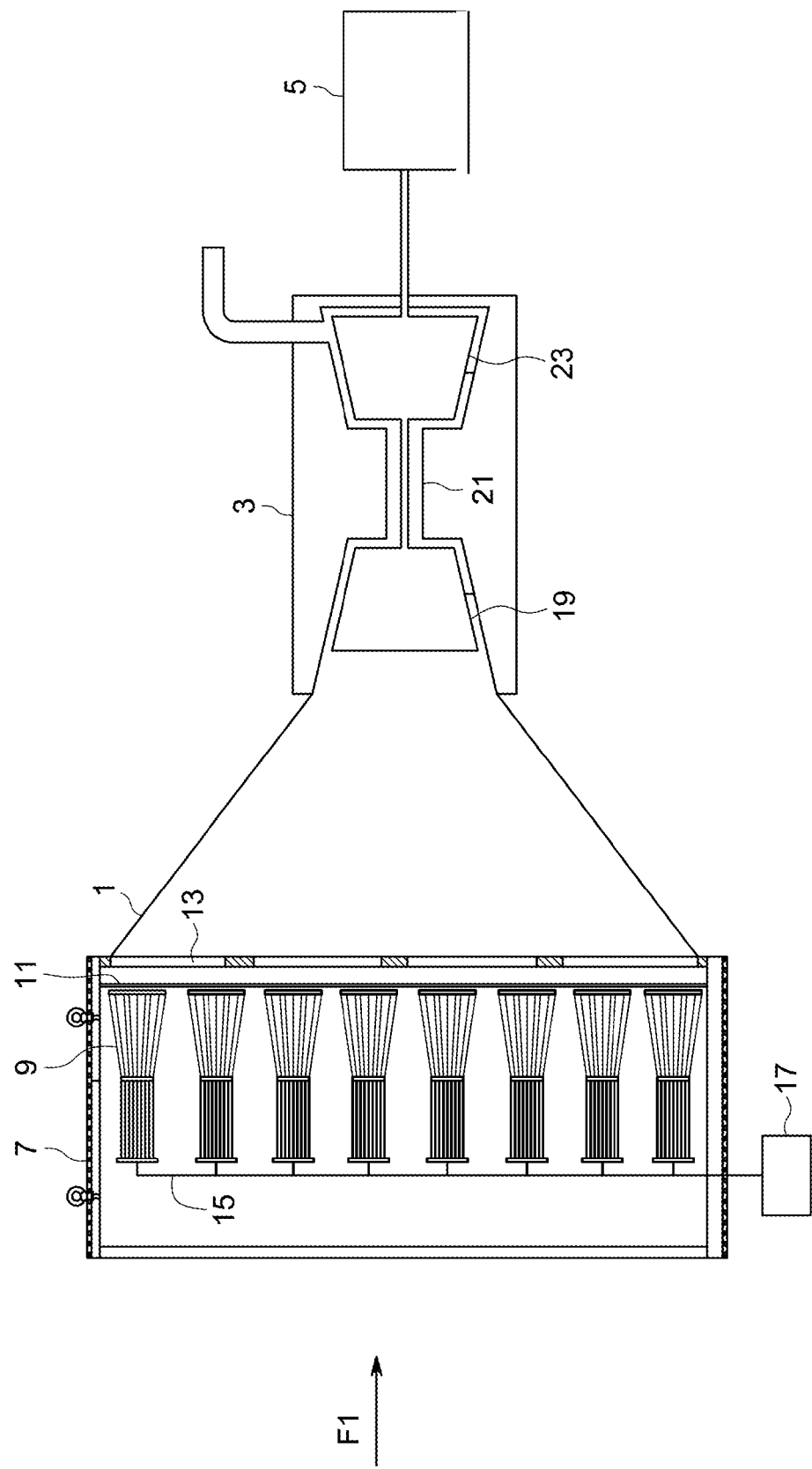
FIG. 1 is an overall view of a filter and air intake system as disclosed by one embodiment of the present invention.

As shown in FIG. 1, an embodiment of a power generation unit is depicted where the unit may include an air filter unit 1, a gas turbine unit 3, and a generator 5. In this embodiment, air is directed in a first direction F1 through the air filter unit 1 and into the gas turbine unit 3. Gas turbine unit 3 may include a compressor 19, a combustor 21, and a turbine 23. During normal operation, air may be drawn into compressor 19, where the air is pressurized and subsequently fed to the combustor 21. The air is then mixed with fuel and ignited, providing the driving force for the turbine 23.

The air filter unit 1 may include a housing 7 which may be of any suitable configuration to allow the encapsulation of a tubesheet 11 and any desired amount of filters 9 for effective filtration and sufficient air flow to the gas turbine unit 3. The housing 7 may be several stories high and contain up to several hundred filters 9. As shown in FIG. 1, air flows in a first direction F1 into the housing 7, where particulate matter is collected on filter 9 before passing through a tubesheet aperture (not shown). As air continues to flow in first direction F1 through the tubesheet aperture, it exits the housing 7 at a housing outlet 13 before entering the gas turbine unit 3.

The tubesheet 11 may be constructed and arranged to separate the housing 7 into a first plenum side of the housing which is located upstream of the filter 9 and a second plenum side which is located downstream of the filter 9. Tubesheet 11 may be a vertical sheet constructed of any material suitable for preventing the passage of air therethrough.

The filter 9 may be any suitable configuration and material to allow the collection of particulate matter on its surface. Filter 9 may be secured to the tubesheet through any suitable means, where in exemplary embodiments, a support frame (not shown) may be connectable with the tubesheet 11 for supporting the filter 9. Filter 9 may be a fabric filter media, specifically constructed and configured for facilitating the collection of particulate matter.

Figure 2:
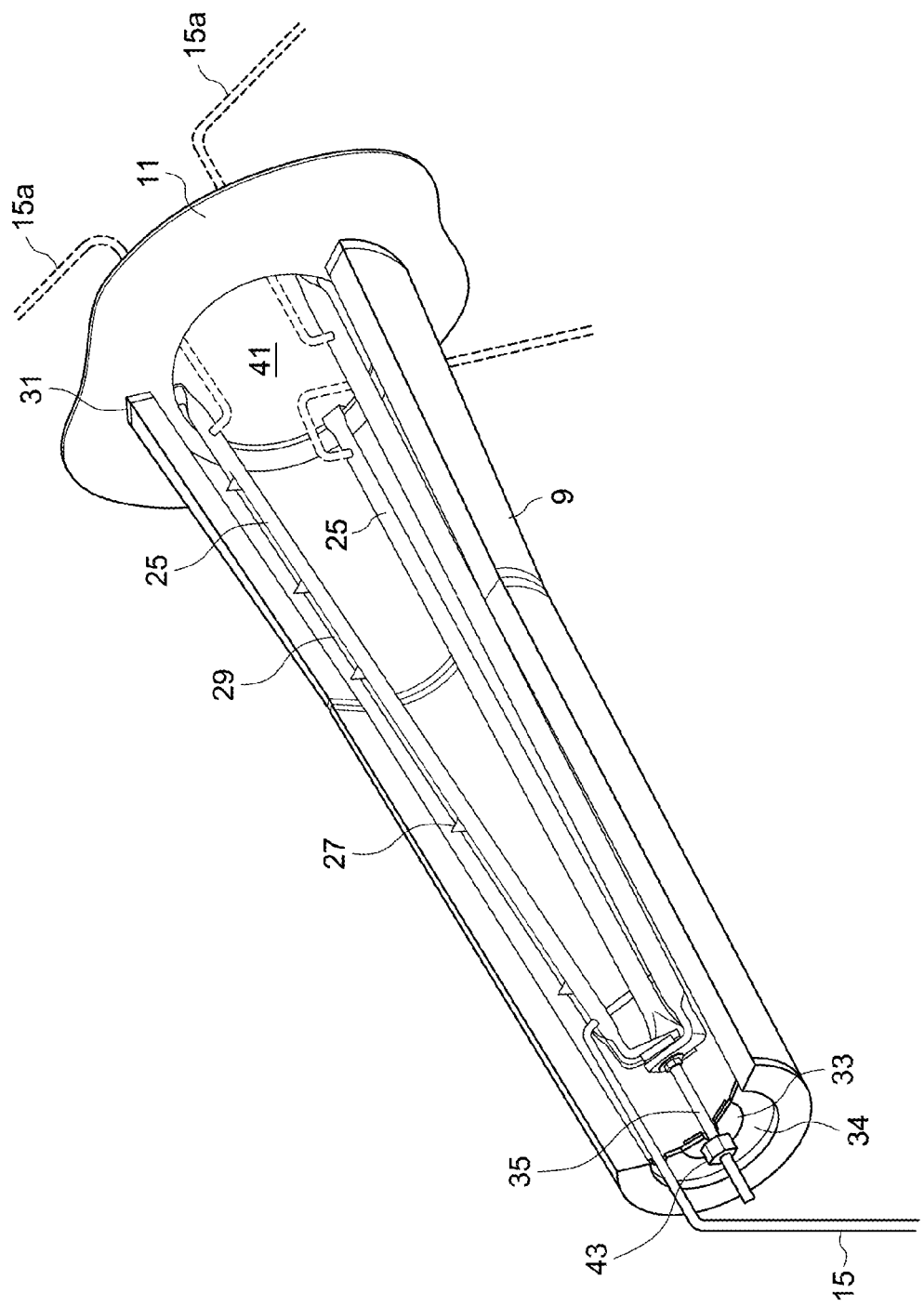
FIG. 2 is a perspective view of an embodiment of the present invention where a filter is partially cutaway to reveal a support frame and integrated cleaning system.
Figure 3:
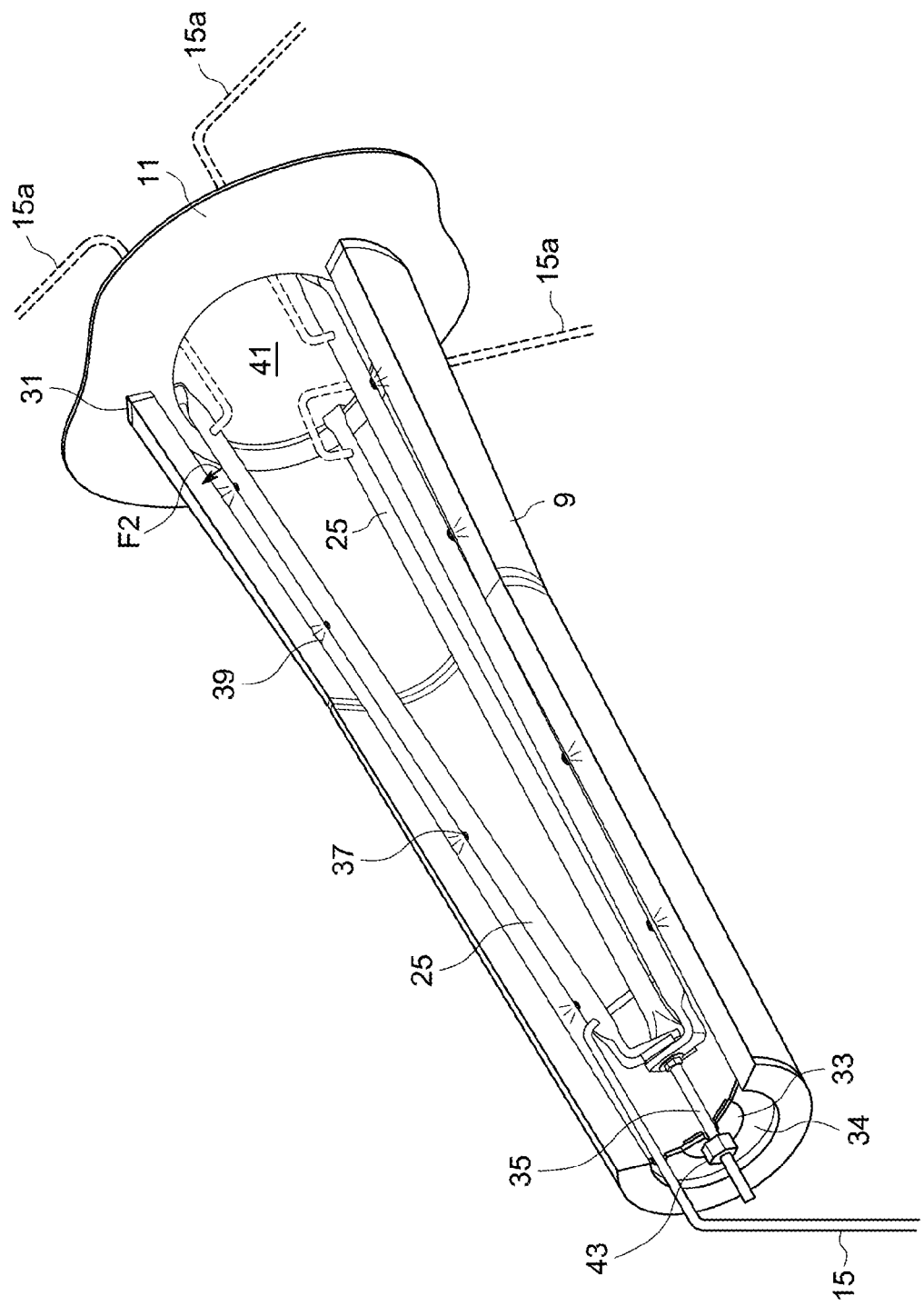
FIG. 3 is a perspective view of an exemplary embodiment of the present invention where a filter is partially cutaway to reveal a support frame and integrated cleaning system.

Referring now to FIGS. 2 and 3, a more detailed depiction of an exemplary embodiment of filter 9 is depicted. Filter 9 may be a two piece filter set, where a first portion is of a substantially uniform tubular configuration and a second portion has a frusto-conical shape. The first portion of filter 9 may have a first closed end, embodied by front cap 34 and a second open end coupled to a first smaller diameter frusto-conical end of the second portion of the filter 9. A second larger diameter frusto-conical end of the second portion of filter 9 has an open end adapted to be located adjacent to and surrounding the tubesheet aperture 41. The open end of filter 9 may also be constructed and arranged to fully encapsulate tubesheet aperture 41. Furthermore, in order to prevent air bypass between the tubesheet 11 and filter 9, a gasket 31 may be implemented.

FIGS. 2 and 3 also depict a support frame 25 that may be of any suitable configuration for supporting the filter 9. Support frame 25 may have any desired number of support legs and in an exemplary embodiment, it may have three support legs in a tripod configuration. The support frame 25 may be coupled to the tubesheet 11 at divergent ends of the support legs, where examples of specific coupling means will be discussed later. At convergent ends of the support legs, a carriage bolt 35 may connect to the support legs at a carriage bolt first end and extend in a direction opposite the support legs. The carriage bolt 35 may have an end plate 33 at a carriage bolt second end. The end plate 33 may be of any suitable size and configuration and in an exemplary embodiment as depicted in FIGS. 2 and 3, it also serves as a means to secure the support frame 25 to the filter 9. Securing the support frame 25 to the filter 9 is accomplished by inserting carriage bolt 35 through front cap 34 and end plate 33, where end plate 33 is concentrically disposed upon front cap 34 on the first plenum side of the housing. A hex nut 43 may then secure end plate 33 to front cap 34.

As mentioned above, the support frame 25 may include any desired number of support legs. The support legs may facilitate substantially uniform cleaning of the filter 9. In exemplary embodiments of the present invention, the support legs may be approximately equally radially spaced from each other about a circumference of the tubesheet aperture 41. For example, if the support frame 25 includes three support legs in a tripod configuration, each leg may be spaced at approximately 120° from each other.

Furthermore, in reference to FIG. 2, a cleaning jet source 27 may facilitate substantially uniform cleaning of the filter 9. For example, in this embodiment of the present invention, the filter 9 and support legs of the support frame 25 should be arranged such that a distance between each of the plurality of support legs and a corresponding nearest interior surface of the filter 9 is no less than approximately 2.54 centimeters (1 inch). This will give a cleaning jet (not shown) ample distance to emanate from a cleaning jet source 27 and expand so enhanced cleaning efficiency may be achieved on the surface area of the filter 9. Substantially uniform cleaning of the filter 9 may also be accomplished by arranging cleaning jet sources 27 along the length of each of the support legs.

Also as shown in FIG. 2, cleaning jet source 27 may be in the form of an external nozzle, for example. Any number of cleaning jet sources 27 may be utilized in order to facilitate uniform cleaning of the filter 9. In this embodiment of the present invention, cleaning jet sources 27 may be located along the length of the support legs. As mentioned above, cleaning fluid may be provided to the cleaning jet source 27 via a pulse tube 15. Dissemination of cleaning fluid to the cleaning jet source 27 may be further facilitated through the use of a cleaning system hose 29 where the cleaning system hose 29 may facilitate fluid communication, such as, but not limited to, substantially unimpeded flow, between the cleaning jet sources 27 and the pulse tube 15.

FIG. 3 depicts an exemplary embodiment of the present invention wherein the support legs may be hollow for facilitating the flow of cleaning fluid therethrough. Cleaning jet sources are also in the form of cleaning apertures 37, for example, in this embodiment. Cleaning apertures 37 may be disposed within the support frame 25 by any suitable means such as drilling or boring, for example. They may also be of any suitable size and configuration to facilitate enhanced cleaning efficiency of the filter 9. As the pressure drop across the cleaning jet sources increases, the cleaning efficiency of cleaning jet 39 may suffer. Therefore, in an exemplary embodiment, cleaning apertures 37 or cleaning jet sources may vary in size as the distance between a fluid supply and the cleaning apertures 37 or cleaning jet sources increases.

As mentioned above, FIGS. 1-3 also depict a pulse tube 15 that may act as a conduit for providing cleaning fluid to a cleaning jet source 27 or cleaning aperture 37 via a fluid supply 17. Pulse tube 15 may be a single interconnected tube with branches that provide cleaning fluid to each filter 9 simultaneously, or it may be individual tubes corresponding with each separate filter 9. A first end of the pulse tube 15 may be connected to a fluid supply 17 and a second end may terminate at a front cap 34 of the filter 9, where fluid communication, such as, but not limited to, substantially unimpeded flow, between the fluid supply 17 and the cleaning jet source 27 or cleaning aperture 37 may be accomplished by several means to be discussed later.

Figure 5:
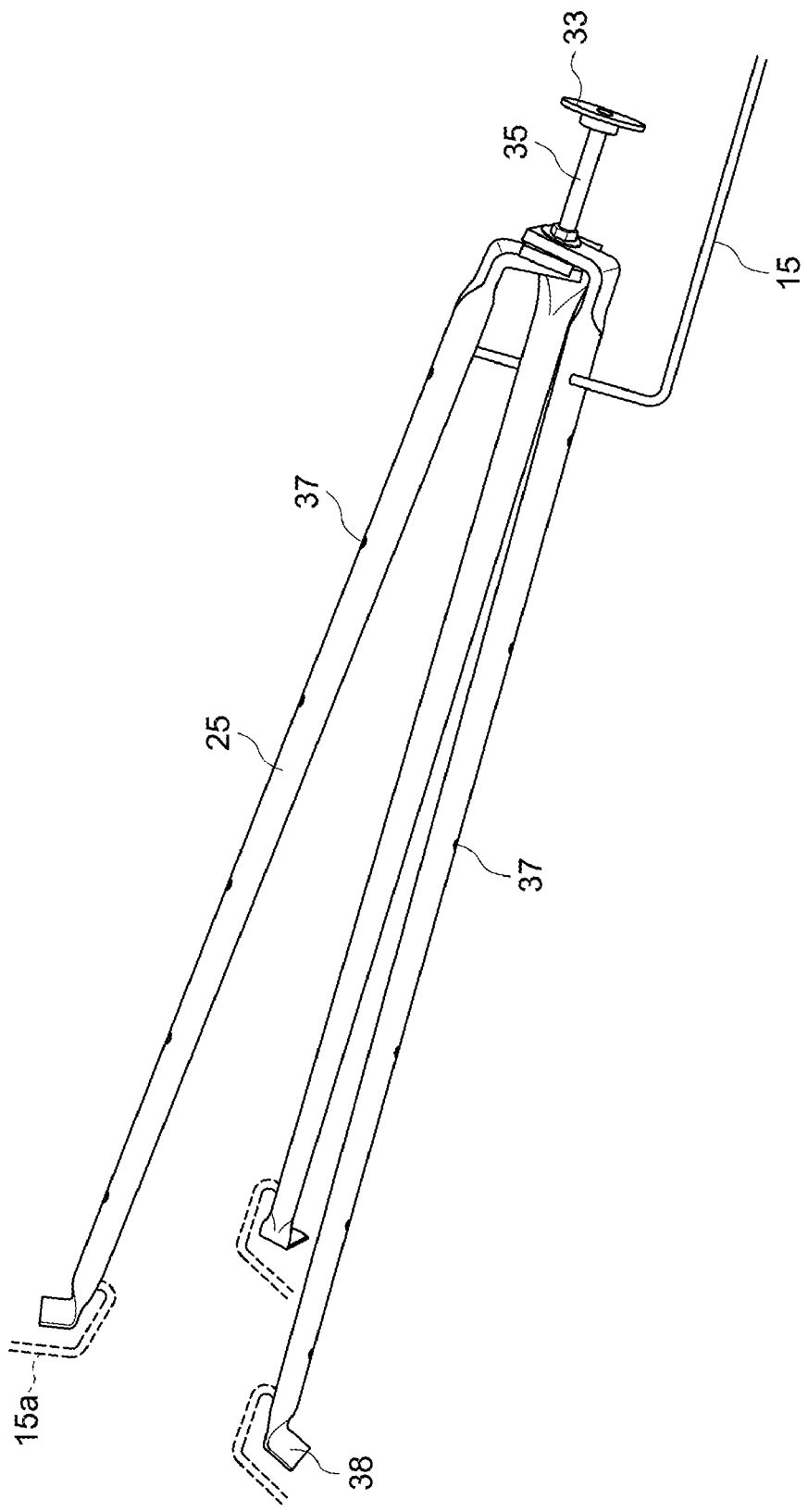
FIG. 5 is a perspective standalone view of a support frame and integrated cleaning system representing an exemplary embodiment of the present invention.

In order to facilitate fluid communication, such as, but not limited to, substantially unimpeded flow, between the cleaning aperture, support legs that may be hollow, and the pulse tube, many configurations may be utilized. One possible configuration, as shown in FIG. 3, includes pulse tube 15 inserted through front cap 34 and subsequently connectable to support frame 25. Pulse tube 15 may connect to one support leg and then extend to the other support legs as shown in FIG. 3, or the pulse tube 15 may be individually connectable to each separate support leg. Alternatively, fluid may be supplied to the support frame 25 at the divergent ends of the support legs. As shown in FIGS. 2, 3, and 5, the fluid coupling may be accomplished by inserting an alternate pulse tube 15a through the housing on the second plenum side and having the pulse tube 15a connectable to the divergent ends of the support legs through the tubesheet aperture as shown substantially in FIGS. 2 and 3. It should be noted that pulse tube 15 and alternate pulse tube 15a normally will not be present in embodiments of the invention at the same time. The alternate pulse tube may also be connectable to the divergent ends of the support legs through a space in between the open end of the filter and the tubesheet.

Figure 4:
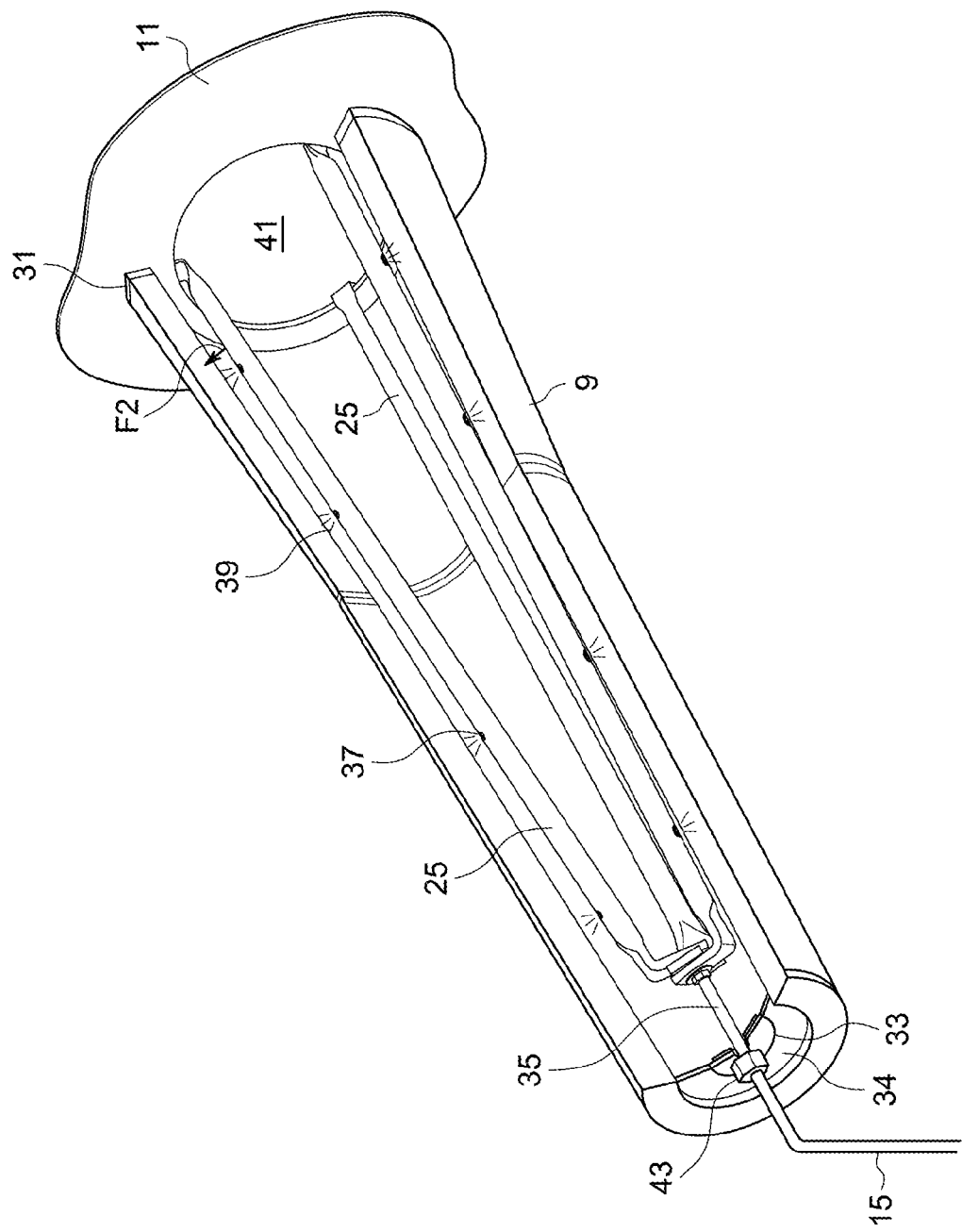
FIG. 4 is another perspective view of an exemplary embodiment of the present invention where a filter is partially cutaway to reveal a support frame and integrated cleaning system.

Another configuration for facilitating fluid communication, such as, but not limited to, substantially unimpeded flow, is shown in FIG. 4 where cleaning fluid is provided to the support frame 25 by pulse tube 15 via the carriage bolt 35. This may be accomplished, for example, where a hollow carriage bolt is provided having a hollow carriage bolt first end fluidly coupled to convergent ends of the support legs. A hollow carriage bolt second end may be threaded and extend through the front cap and end plate. The pulse tube may then be threadably connected to the hollow carriage bolt second end where the end result is a substantially unimpeded conduit between the fluid supply and cleaning jet sources.

Cleaning fluid may be supplied to the support frame 25 for any suitable duration and at any pressure necessary for cleaning the filter 9. However, it may be desirable for cleaning fluid to not be supplied in such a way that cleaning fluid flowing in a second direction F2 is not greater than the flow of intake air in a first direction. It is desirable to perform reverse pulse cleaning without impeding the flow of intake air and operation of the power generation unit. Therefore, in an exemplary embodiment, cleaning fluid may be supplied to the cleaning system at a pressure in the range of about 5 bar to about 8 bar and for a duration in the range of about 0.05 seconds to about 0.5 seconds.

FIG. 5 represents an exemplary embodiment of the present invention where the support frame 25 has hollow support legs having at least one cleaning aperture 37. Furthermore, weld points 38 for example, may be present at the divergent ends of the support legs and may be of any suitable size and configuration to accommodate coupling to a tubesheet. In this embodiment, support frame 25 may be inserted through a tubesheet aperture so that the support frame 25 is on a first plenum side of the housing and weld points 38 hook onto the tubesheet on a second plenum side of the housing. Weld point 38 may be a substantially flat protrusion in which a sufficient amount of surface area is available to accommodate a weld between the tubesheet and weld point 38. For example, sufficient surface area is required for processes such as brazing so that a filler metal may diffuse itself between two surfaces. Moreover, other configurations for accommodating coupling of the support frame 25 to the tubesheet may include bolts, screws, or any other feasible mechanical means.

Figure 6:
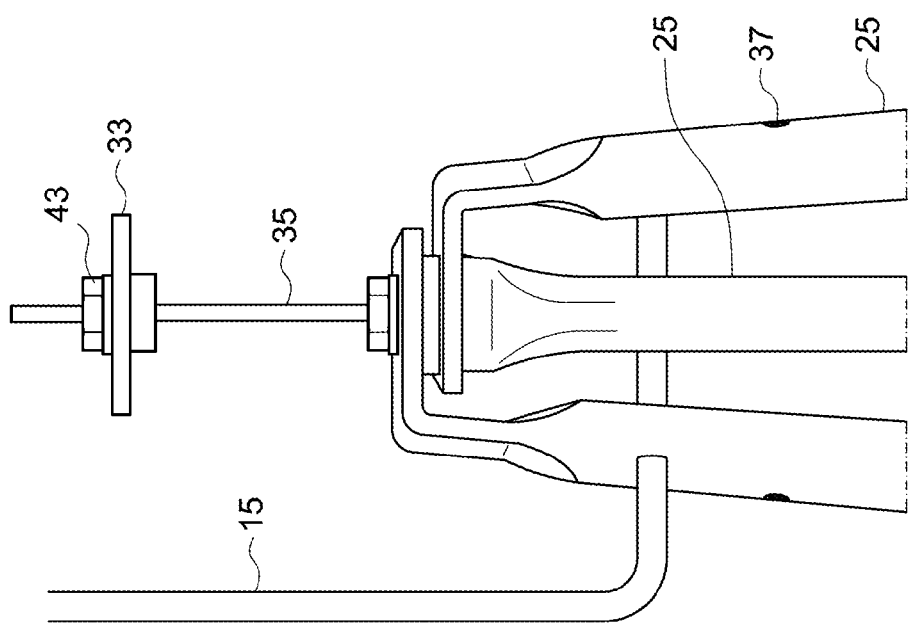
FIG. 6 is an enlarged, partial side view of an exemplary embodiment of the support frame of FIG. 5.

As shown in FIG. 6, an enlarged view of the convergent ends of the support legs of the support frame 25 is depicted for an exemplary embodiment. The support legs are shown to be in communication with each other with a carriage bolt 35 extending therefrom.

Figure 7:
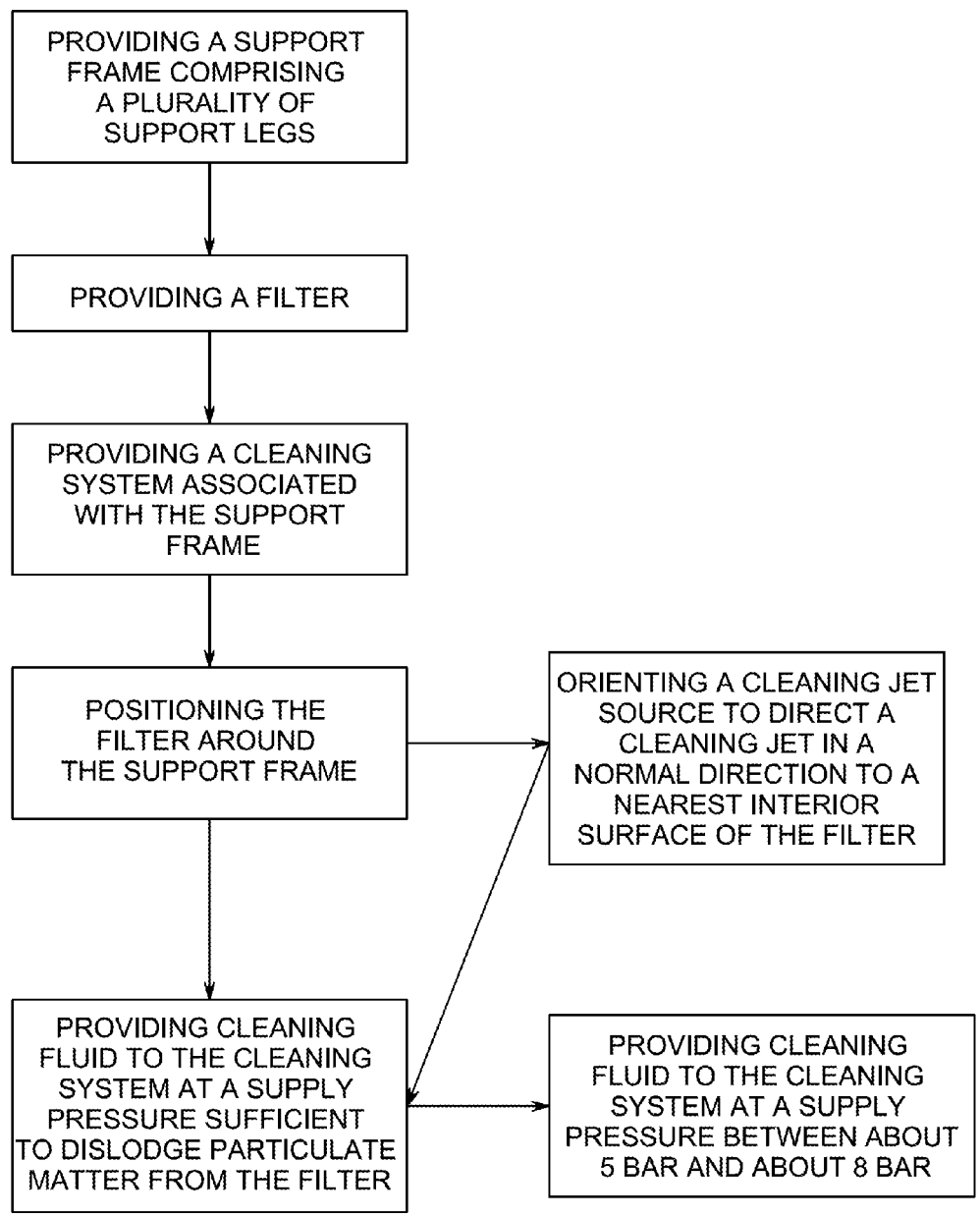
FIG. 7 is a flow diagram illustrating a method for cleaning a filter.
Figure 1:
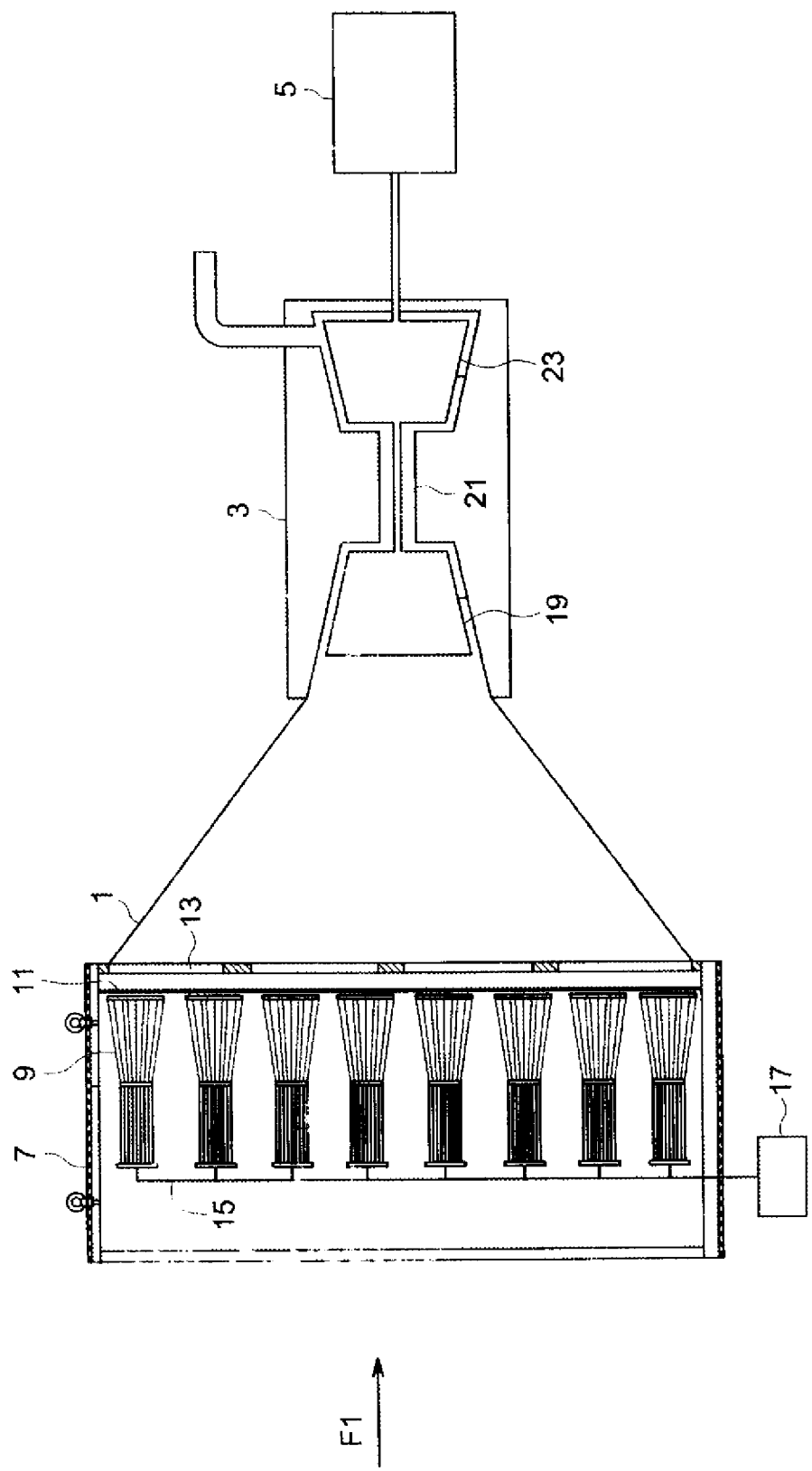

A method for cleaning a filter is illustrated in FIG. 7. The method comprises providing a support frame comprising a plurality of support legs, a filter, and a cleaning system associated with the support frame. The cleaning system may comprise a cleaning jet source for directing cleaning fluid in a second direction. The method further comprises positioning the filter around the support frame and providing cleaning fluid to the cleaning system at a supply pressure sufficient to dislodge particulate matter from the filter. The supply pressure may be any suitable pressure, and in an exemplary embodiment, may be between about 5 bar to about 8 bar. Furthermore, the positioning may further include orienting a cleaning jet source to direct a cleaning jet in a normal direction to a nearest interior surface of the filter. For example, a normal direction would be a direction where a cleaning jet effectuates cleaning of approximately 120° of a corresponding interior surface of a filter if the support frame has three support legs.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any, and all, combinations of one or more of the associated listed items.

The terminology used herein is for describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

From the above description of at least one aspect of the invention, those skilled in the art will perceive improvements, changes and modifications. Such improvements, changes and modifications within the skill of the art are intended to be covered by the appended claims.

What is claimed is:

1. A particulate filtration reverse pulse cleaning system comprising:
    a housing through which air flows in a first direction towards a housing outlet;
    a tubesheet disposed within the housing, the tubesheet comprising a tubesheet aperture;
    a filter for fluid communication with the tubesheet aperture, the filter comprising an open end adapted to be located adjacent to and surrounding the tubesheet aperture;
    a support frame connectable with the tubesheet, the support frame supporting the filter, the filter through which air flows in the first direction, the support frame including a plurality of hollow support legs; and
    a cleaning system associated with the support frame, the cleaning system comprising a cleaning jet source directing cleaning fluid through at least one of the plurality of hollow support legs in a second direction opposite the first direction, the cleaning jet source comprising a plurality of cleaning jet sources located along the length of the plurality of support legs, wherein the plurality of the support legs are approximately equally radially spaced from each other about a circumference of the tubesheet aperture, and the plurality of support legs comprise three support legs in a tripod configuration.

2. The system of claim 1 wherein the plurality of support legs are hollow facilitating the flow of cleaning fluid therethrough, the cleaning jet source comprising at least one cleaning aperture extending through the plurality of support legs for directing cleaning fluid in the second direction.

3. The system of claim 1 wherein the plurality of cleaning jet sources vary in size as the distance between a fluid supply and the plurality of cleaning jet sources increases.

4. The system of claim 1 wherein the cleaning fluid is pressurized air.

5. The system of claim 1 wherein the support frame further comprising:

an end plate disposed upon a first closed end of the filter on a first plenum side of the housing, the end plate coupled to the plurality of support legs via a carriage bolt.

6. The system of claim 1 wherein the plurality of support legs and the cleaning jet source facilitate substantially uniform cleaning of the filter.

7. The system of claim 6 wherein the plurality of support legs extend from the tubesheet, substantially along the length of the filter.

8. The system of claim 6 wherein the distance between each of the plurality of support legs and a corresponding nearest interior surface of the filter is no less than approximately 1 inch.

9. The system of claim 1 wherein cleaning fluid is supplied to the cleaning system at a pressure in the range of about 5 bar to about 8 bar.

10. The system of claim 1 wherein cleaning fluid is supplied to the cleaning system for a duration in the range of about 0.05 seconds to about 0.5 seconds.

\* \* \* \* \*

UNITED STATES PATENT AND TRADEMARK OFFICE
CERTIFICATE OF CORRECTION

| | |
|---|---|
| PATENT NO. | : 8,382,869 B2 |
| APPLICATION NO. | : 12/821352 |
| DATED | : February 26, 2013 |
| INVENTOR(S) | : Jarrier et al. |

It is certified that error appears in the above-identified patent and that said Letters Patent is hereby corrected as shown below:

In the Drawings:

Please delete drawing sheet 1 of 7 and insert drawing 1 of 7 consisting of figure 1 as shown on the attached page.

Signed and Sealed this
Twenty-third Day of April, 2013

Teresa Stanek Rea
*Acting Director of the United States Patent and Trademark Office*